United States Patent [19]

Hoagland et al.

[11] Patent Number: 4,492,506
[45] Date of Patent: Jan. 8, 1985

[54] UNDER VEHICLE CARRIER FOR A SPARE WHEEL

[75] Inventors: Merle R. Hoagland, Astoria; Robert M. Hoagland; Dean W. Hoagland, both of Warrenton, all of Oreg.

[73] Assignee: DMB Enterprises, Inc., Warrenton, Oreg.

[21] Appl. No.: 489,825

[22] Filed: Apr. 29, 1983

[51] Int. Cl.³ .............................. B62D 43/04
[52] U.S. Cl. .................. 414/463; 224/42.21; 224/42.23
[58] Field of Search ............... 414/463, 464, 465, 466; 224/42.21, 42.23, 42.24, 42.26

[56] References Cited

U.S. PATENT DOCUMENTS

| | | | |
|---|---|---|---|
| 1,589,955 | 6/1926 | Green | 224/42.26 X |
| 1,696,853 | 12/1928 | Ludwig | 224/42.21 X |
| 2,028,945 | 1/1936 | Morrison | 414/463 |
| 2,733,847 | 2/1956 | Pyes | 224/42.21 |
| 3,539,152 | 11/1970 | Paul et al. | 414/463 X |
| 3,856,167 | 12/1974 | Yasue et al. | 414/463 |
| 3,865,264 | 2/1975 | Kuhns | 414/463 |
| 3,865,291 | 2/1975 | Tidwell | 224/42.24 |
| 3,904,093 | 9/1975 | Hanela | 224/42.23 X |
| 4,047,629 | 9/1977 | Klein | 414/463 |
| 4,072,258 | 2/1978 | Cruson | 414/463 X |
| 4,095,709 | 6/1978 | Eller | 414/466 |
| 4,174,797 | 11/1979 | Yasue et al. | 414/463 X |

FOREIGN PATENT DOCUMENTS

| | | | |
|---|---|---|---|
| 1014447 | 8/1957 | Fed. Rep. of Germany | 414/466 |
| 2725611 | 12/1978 | Fed. Rep. of Germany | |
| 793306 | 4/1958 | United Kingdom | 414/463 |

Primary Examiner—Leslie J. Paperner
Attorney, Agent, or Firm—Klarquist, Sparkman, Campbell, Leigh & Whinston

[57] ABSTRACT

An under vehicle carrier for a spare wheel having a tire mounted to a central rim is disclosed and includes an elongated body adapted for mounting to the underside of a vehicle. A first end portion of the body is positioned adjacent to a side or end margins of the vehicle. An arm is pivoted at one end to the first end portion of the body so that it may be raised and lowered. An arm operating assembly, such as a cable and jack screw mechanism, is provided for raising and lowering the arm. Also, a central portion of the rim is releasably coupled to the arm in a manner that maintains the wheel horizontal as it is raised and lowered. As a result, a portion of the wheel is automatically delivered out from underneath the vehicle as the arm is lowered. A spring biasing mechanism urges the arm to a lowered position and maintains the cable taut as it is played out and pulled in. Also, the body defines a compartment within which substantially all of the arm operating assembly is positioned. The arm is sized and shaped to close this compartment when in a fully raised position. This protects the arm operating assembly from flying rocks and other debris. The arm is designed to collapse to reduce the distance from the pivot to the free end of the arm under conditions in which clearance between the underside of the vehicle and ground is extremely limited. This permits lowering of the spare wheel, even under such conditions.

13 Claims, 3 Drawing Figures

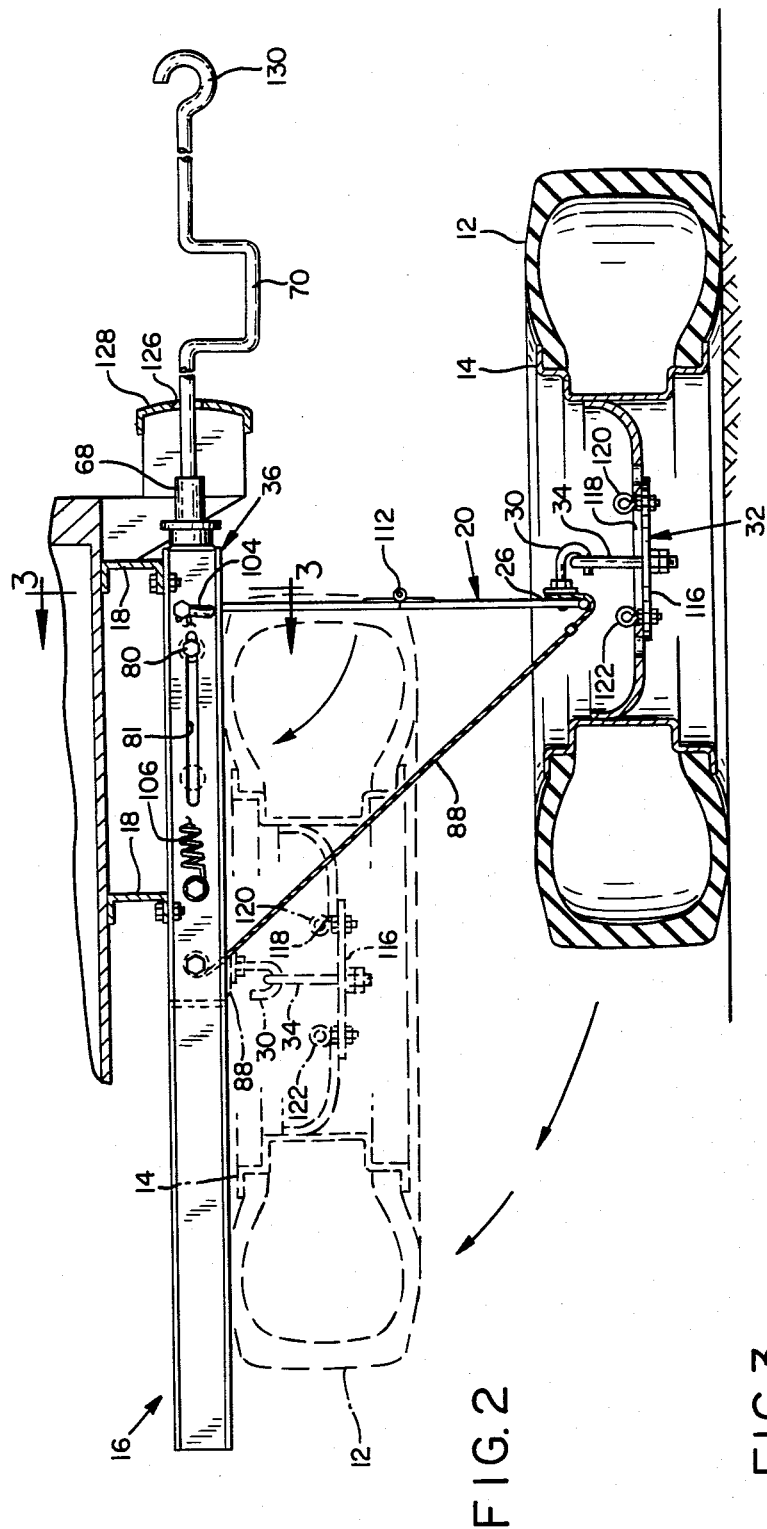
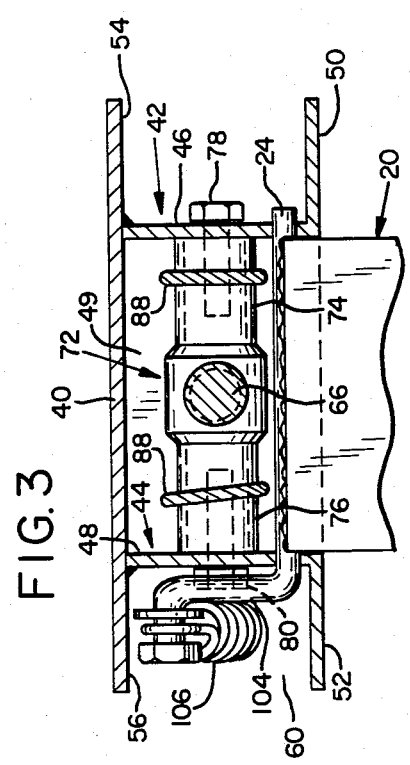

UNDER VEHICLE CARRIER FOR A SPARE WHEEL

BACKGROUND OF THE INVENTION

The present invention relates to a spare wheel carrier mounted to the underside of a vehicle. More particularly, the invention relates to such a spare wheel carrier which is capable of delivering a spare wheel at least partially out from underneath the vehicle.

Previously, devices for holding a spare wheel underneath a vehicle have been known. In one common form of device, a horizontally carried spare wheel is simply lowered directly to the ground. An individual then must crawl or otherwise reach completely underneath the vehicle to retrieve the spare tire. This is a difficult task because of the cramped space under a vehicle. Also, this difficulty is compounded by the heavy weight of spare wheels and because it is hard to grasp and obtain leverage on a spare wheel underneath the vehicle. In addition, it is extremely easy for individuals to soil their clothes when forced to retrieve a spare tire in this manner. U.S. Pat. Nos. 3,539,152 of Paul; 3,856,167 of Yasue et al.; and 3,865,264 of Kuhns are exemplary of such devices.

Another known spare wheel mounting device is shown in U.S. Pat. No. 4,179,797 of Yasue et al. This device includes a spare wheel holder mounted at one end to a frame portion of the vehicle for pivoting about vertical and horizontal axes. A spare wheel is carried upon this wheel holder. The other end of the wheel holder, and hence the supported spare wheel, is raised and lowered about the horizontal axis by a crank actuated cable winch. When lowered, the holder may be pivoted about the vertical axis to position the tire partially out from underneath the vehicle. With this device, an individual still must apparently reach beneath the vehicle to grab and rotate the wheel holder to move the wheel out from under the vehicle. Also, with this device, the wheel inclines as it is lowered. This makes the device more difficult to use under limited clearance conditions, such as when the vehicle is operated on a road which is heavily rutted road and which has a high center.

Still another prior art spare wheel holder is disclosed in German Patent No. 2,725,611. In this device, a spare wheel is mounted to the underside of a U-shaped rack. The rack has rollers at the end of its legs which are disposed in a channel which in turn is mounted to the underside of the vehicle. A crank operated piston shifts the rack, and hence the spare wheel, axially along the channel until one of the rollers is positioned within a gap in the channel. Thereupon, the rack pivots downwardly about the other roller as the spare wheel is lowered to the ground. The spare wheel tilts toward an upright, vertically oriented position as it is lowered. Because of this orientation of the spare wheel, this device would be difficult to use under low clearance conditions.

A further prior art spare wheel holder is disclosed in U.S. Pat. No. 4,047,629 of Kline. In Kline, a spare wheel supporting bar is pivoted at one end for movement about vertical and horizontal axes. A winch and cable mechanism is utilized to lower the free end of the bar so that the spare wheel and bar may be lowered and pivoted out from underneath the vehicle. A similar device is shown in U.S. Pat. No. 4,095,709 of Eller. In Eller, a spare wheel supporting arm is pivoted to a vertical rod which in turn is shiftable vertically to raise and lower the spare wheel. A crank is utilized for this purpose. When a tension member is released, the rod may be lowered and the spare wheel swung out from underneath the vehicle. A still further device is shown in U.S. Pat. No. 4,072,258 of Cruson. In Cruson, a spare wheel is supported by a rack which in turn is suspended by a parallelogram structure from the underside of a vehicle frame. A link extends from the parallelogram structure to a threaded block mounted on a jack screw. When the screw is rotated in one direction, the tire is lowered and extended by the parallelogram structure partially out from underneath the vehicle.

The Eller, Kline, and Cruson devices are each somewhat mechanically complex and bulky. In addition, because of the number of components involved in these devices, it is believed that they would be relatively costly to manufacture.

Therefore, a need exists for an improved spare wheel carrier for the underside of a vehicle which is compact, relatively mechanically simple, easy to use even under limited clearance conditions, and which offers other advantages.

SUMMARY OF THE INVENTION

An under vehicle carrier for a spare wheel having a tire portion mounted to a central rim portion is disclosed. The carrier includes an elongated body adapted for mounting to the underside of a vehicle with a first end portion of the body positioned adjacent to the end or side margins of the vehicle's underside. An arm means or arm is pivoted to the first end portion of the body for movement about a horizontal pivot axis. This enables raising and lowering the free end of the arm. An arm operating means, such as a threaded shaft actuated cable assembly, is provided for raising and lowering the arm. In addition, a spare wheel coupling means releasably and pivotally couples a central rim portion of a horizontally oriented spare wheel to the free end of the arm. With this coupling, the spare wheel remains horizontal as the arm is raised and lowered. In addition, with this construction, a portion of the spare wheel is automatically delivered out from underneath the vehicle as the arm is lowered.

As one feature of the invention, the coupling means balances the spare wheel continuously in a horizontally oriented position to minimize the clearance required to raise and lower the spare wheel.

As a further feature of the invention, the coupling means includes a hook mounted to and depending from the free end portion of the arm and a hook engaging means releasably connected to the rim portion of the spare wheel for engaging the hook to couple the spare wheel to the arm.

As a more specific feature of the invention, the hook engaging means comprises a rim abutting member sized larger than a central opening through the rim portion of the spare wheel and a ring which projects upwardly from one side of the abutting member, whereby upon positioning of the rim abutting member against the underside of the rim portion of a horizontal spare wheel with the ring projecting upwardly through the rim central opening, the ring is positioned for engagement by the hook to couple the spare wheel to the arm means.

As still another specific feature of the invention, a mechanism is provided for releasably clamping the ring abutting member to the rim portion of the spare wheel, this mechanism being adjustable to clamp the ring abutting member to rims with rim central openings of various sizes.

As a further feature of the invention, the arm is collapsible so as to automatically reduce the distance between the horizontal pivot axis and the free end of the arm under conditions of extremely limited clearance between the underside of the vehicle and ground, thereby permitting the lowering of the spare wheel under such conditions.

As a more specific feature of the arm, it comprises first and second arm sections which are pivotally interconnected, as by a hinge, to permit collapsing of the arm if the spare wheel hits the ground before the arm is fully lowered.

As another feature of the invention, a biasing means, which may comprise a biasing spring, is provided for biasing the arm to a lowered position.

As still another feature of the invention, the body forms a compartment which is closed by the arm whens in a raised position, the arm operating mechanism being positioned substantially within the compartment so that it is protected from flying rocks, dirt, and other adverse environmental conditions.

As a still further feature of the invention, the body includes flange portions which protect the biasing mechanism.

As another feature of the invention, the body is sized longer than the diameter of the spare wheel and the tire portion of the spare wheel is pressed tightly against the body when the spare wheel is carried.

It is accordingly one object of the invention to provide an improved under vehicle carrier for a spare wheel.

It is still another object of the invention to provide a spare wheel carrier which delivers a spare wheel at least partially out from underneath the vehicle where it is easy to reach.

A further object of the invention is to provide a spare wheel carrier which automatically delivers a portion of the spare wheel out from underneath the vehicle as the spare wheel is lowered from its carried position.

Still another object of the invention is to provide a spare wheel carrier operable under conditions of limited clearance between the underside of the vehicle and the ground.

A further feature of the invention is to provide a spare wheel carrier which is extremely versatile so that it may be used for carrying spare wheels for a wide variety of vehicles.

Still another object of the invention is to provide a spare wheel carrier which is compact and designed to protect the mechanical components of the carrier.

Still another object of the invention is to provide a spare wheel carrier which is rugged and durable, relatively mechanically simply and inexpensive to manufacture, and which is easy to install and use.

These and other objects, features, and advantages of the invention will become apparent with reference to the following description and drawings.

BRIEF DESCRIPTION OF THE DRAWINGS

FIG. 2 is a side elevational view of the vehicle carrier of FIG. 1 with a carried spare wheel shown in raised and lowered positions; and FIG. 3 is a cross sectional view of the spare wheel carrier of the invention taken along lines 3—3 of FIG. 2.

DETAILED DESCRIPTION OF THE PREFERRED EMBODIMENT

Figure 1:
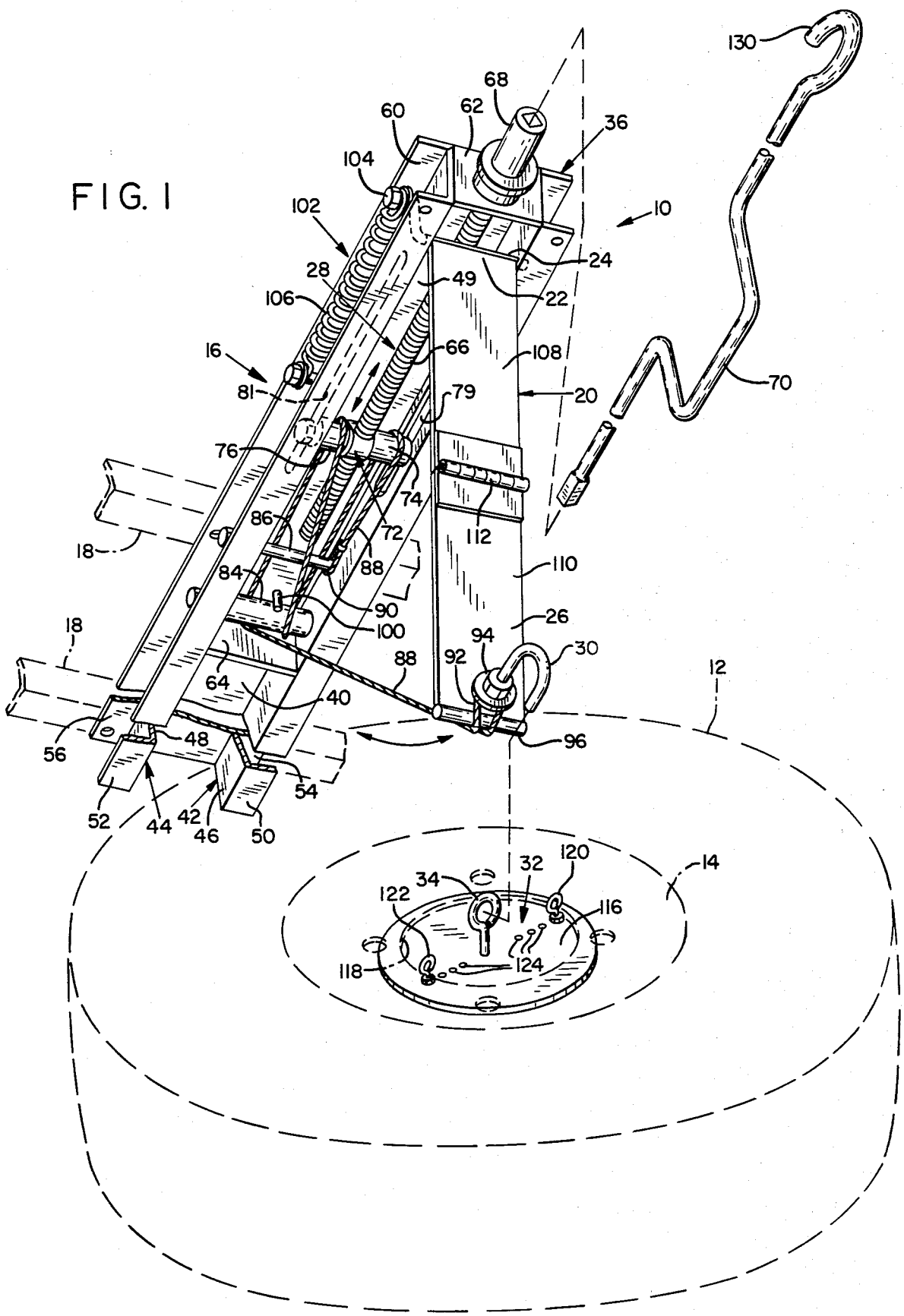
FIG. 1 is a perspective view of a spare wheel carrier in accordance with the present invention.

With reference to FIG. 1, a spare wheel carrier 10 is illustrated for mounting a spare wheel, which includes a tire 12 and rim 14, to the underside of a pick-up truck or other vehicle. Carrier 10 includes a body 16 adapted for mounting to components, such as lateral supports 18, of the vehicle frame. An arm 20 has one end 22 pivoted by a horizontal pivot pin 24 to the body 16 so that the free end of the arm 26 may be raised and lowered about this pivot axis. An arm raising and lowering mechanism, such as a cable and jack or winch assembly 28, is provided for raising and lowering the arm.

The spare wheel is releasably and pivotally coupled to the free end 26 of the arm so that it remains in a horizontally oriented position as the arm is raised and lowered. This orientation facilitates lowering of the spare wheel, even under conditions in which there is limited clearance between the underside of the vehicle and the ground. Although other coupling mechanisms may be utilized, in the preferred embodiment, a hook 30 is mounted to and depends from the underside of the free end 26 of the arm. In addition, a spare wheel engaging assembly 32, including an upwardly projecting ring 34 selectively couples the rim 14 to the free end of the arm when hook 30 is inserted within the ring 34. Consequently, when so engaged, the spare wheel is balanced in a horizontal position as it is raised and lowered.

As illustrated in FIG. 2, the body 16 is mounted so that its end portion 36, nearest the pivot 24, is adjacent the side or end margins of the underside of the vehicle. As a result, when the wheel is lowered from its carried position shown in dashed lines in FIG. 2, the arm swings the wheel at least partially out from underneath the vehicle to the position shown in solid lines in FIG. 2. Thus, there is no need to crawl underneath the vehicle in order to retrieve the spare tire.

With reference to FIGS. 1 and 3, the body 16 will next be described in detail. The body is of a strong, durable material, such as steel, and includes a rectangular base plate 40 and first and second side wall members 42, 44. Each side wall member 42, 44 includes respective wall portions 46, 48, and flange portions 50, 52. The wall portions are parallel to and spaced apart from one another, while the flanges project outwardly away from one another. The wall portions define an elongated arm operating mechanism receiving channel 49 between them. In addition, the wall portions are spaced inwardly from the respective side edges of the base plate 40. This provides side margins 54, 56 of the base plate which may easily be bored anywhere along their length to accommodate mounting bolts or other fasteners for securing the body to the vehicular frame. Thus, the apparatus may be easily installed to a wide variety of vehicles. The side margins 54, 56 are simply bored as required for mounting to the framework of the specific vehicle to which the apparatus is being mounted. Of course, the side margins may be pre-bored if desired.

The body is designed to protect the arm operating assembly 28. An end plate 62 extends between the walls 48, 46, at end 36 of the body to close this end of the channel 49. In addition, a cross plate 64 extends between the walls 46, 48 at a location intermediate the ends of the body to close the channel at its location as well. Consequently, the base plate 40, side walls 46, 48, end plate 62, and cross plate 64 define a compartment within which the arm operating assembly 28 is positioned. This compartment is open at the bottom, but closed by the arm 20 when the arm is in a fully raised position. Consequently, the arm operating assembly is enclosed during normal use so that it is protected from flying rocks, dirt, and other adverse elements.

The arm operating assembly 28 includes an externally threaded shaft 66 rotatably mounted at one end to the end plate 62. The shaft 66 extends axially within the channel 49. A shaft actuator 68 is connected to the end of the shaft and projects outwardly beyond the end plate 62 so that it is accessible from the exterior of the compartment. Rotation of the actuator, as by a crank 70, causes a corresponding rotation of the shaft. The assembly 28 also includes an internally threaded cable control 72 which is threadedly mounted to the shaft 66. Thus, rotation of the shaft in one direction shifts the cable control axially along the shaft in one direction. Conversely, rotation of the shaft in the opposite direction shifts the cable control along the shaft 66 in the other direction. The cable control 72 includes first and second cable guide extensions 74, 76 extending laterally within the compartment. With reference to FIGS. 1 and 3, a bolt 78 extends through an elongated slot 79, through wall 46, and into the end of cable guide extension 74. A similar bolt 80 extends through an elongated slot 81 through the wall 48 and into the end of the cable guide extension 76. Consequently, the cable guide extensions slidably engage the respective walls 46, 48 of the body. Also, a tubular cable guide 84 extends between the walls 46, 48 at a location adjacent to, but spaced from, the cross plate 64. In addition, a cable retaining pin 86 extends between these walls at a location adjacent the free end of the shaft 66.

The arm operating assembly also includes a cable 88 with one end 90 fixed to the pin 86 and its other end 92 fastened to the free end 26 of arm 20. From pin 86, the cable passes around the cable guide extension 74, around the cable guide 84, around cable guide extension 76, back around cable guide 84, and then to the free end 26 of the arm 20. More specifically, the cable 88 passes over the free end of the arm and is held in place by a nut and washer assembly 94 mounted to the shank of the hook 30. The outer end 96 of the arm is enlarged to minimize wear between the arm and cable. In addition, a pin 100 projects downwardly from base plate 40 adjacent cable guide 84 to prevent the lengths of cable from overlapping one another and fouling up.

With this construction, rotation of the shaft 66 in one direction pulls in the cable and raises the arm. Conversely, rotation of the shaft in the opposite direction plays out cable and causes the arm to be lowered. Because of the way in which the cable is wound, travel of the cable control 72 through a distance X causes a 4X length of cable to either be played out or pulled in. Thus, an efficient mechanism is provided for raising and lowering the arm 20.

A biasing mechanism 102 is provided for biasing the arm to a lowered position. This maintains the cable 88 taut as it is played out and pulled in. In the preferred embodiment, this mechanism includes a crank portion 104 (FIG. 3) of pivot pin 24. This crank 104 is positioned within a biasing channel 60 (FIG. 3) between the flange 52 and side margin 56 of the base plate 40. A spring 106 is connected at one end to the crank 104 and at its other end to the body to accomplish its biasing function. When so positioned, the flange 52 helps shield the biasing mechanism from damage due to flying rocks and other debris.

Referring again to FIG. 1, arm 20 is constructed so that it is collapsible to reduce the distance between the pivot 24 and the free end 26 of the arm 20. This allows the spare wheel to be lowered when there is extremely limited clearance between the underside of the vehicle and ground. In its illustrated form, the arm 20 is planar and plate-like with first and second arm sections 108, 110 which are pivotally interconnected by a hinge 112. Under usual conditions in which there is ample clearance for the arm, the adjacent ends of arm sections 108, 110 abut one another so that the arm is rigid. The arm sections are held in this abutting relationship by the cable and the tension exerted by the biasing spring. Under limited clearance conditions, the spare wheel may hit the ground before the arm 20 is fully lowered. In this situation, the arm sections 108, 110 automatically move relative to one another about the axis of the hinge 112, permitting continued lowering of the arm and delivery of the spare wheel. Therefore, even under these conditions, the spare wheel may easily be removed from the vehicle.

The spare wheel engaging assembly 32 includes a planar, plate-like disk 116 of a dimension which is larger than the dimension of the central opening 118 of the spare wheel rim 14. Consequently, when the disk 116 is positioned at the underside of the rim portion 14 with ring 34 projecting upwardly through the center of the rim opening, and the ring 34 is engaged by the hook 30, the spare wheel is coupled to the free end 26 of the arm.

A clamping mechanism is provided for releasably clamping assembly 32 to the rim of the spare wheel. In the illustrated embodiment, this mechanism includes a pair of eye bolts 120, 122 which may be pivoted ninety degrees to engage the upper surface of the rim after the ring 34 is inserted through the rim opening. This clamps the disk to the rim. Apertures 124 are provided through disk 116 in a line along the diameter of the disk. The eye bolts 120, 122 are positioned in selected apertures 124 to fit within the rim openings and clamp disk 116 to rims with openings of various dimensions.

The operation of the spare wheel carrier of the invention is readily apparent from FIG. 2. When arm 20 is in its raised position, because the body is of a length longer than the greatest dimension of the spare wheel, the tire 12 is wedged tightly against the body. Assuming the vehicle has a flat tire, the crank 70 may be inserted through an access opening 126 provided in the vehicle bumper 128 and into the actuator 68. Rotation of the crank 70 in the appropriate direction lowers the arm 20 and spare wheel. Because the spare wheel is balanced on the hook 30, it remains in a horizontally oriented position as it is lowered. When the arm is fully lowered, the spare wheel is delivered at least partially out from underneath the vehicle, as shown in solid lines in FIG. 2. Also, if clearance is extremely limited, the arm will collapse at hinge 112, permitting the arm and spare wheel to be lowered even under such conditions. When lowered, because the free end portion of the hook 30 is moved from a vertical position, shown in dashed lines, to a horizontal position, shown in solid lines, it is easy to simply slide the tire off of the hook. Futhermore, crank 70 may be provided with a corresponding hook 130. Hook 130 may be inserted into the ring 34 and used to drag the tire to the side of the vehicle, where it is mounted in place of the flat tire. The above steps are reversed to position a spare wheel within the carrier.

Having illustrated and described the principles of our invention with reference to one preferred embodiment, it should be apparent to those persons skilled in the art that such invention may be modified in arrangement and detail without departing from such principles. We claim as our invention all such modifications as come within the true spirit and scope of the following claims.

We claim:

1. An under vehicle carrier for a spare wheel having a tire portion mounted to a central rim portion, comprising:

an elongated body adapted for mounting to the underside of the vehicle with a first end portion of the body positioned adjacent to a side or end margin of the underside of the vehicle;

arm means pivoted at one end to the first end portion of said body for movement about a horizontal pivot axis so as to raise and lower the free end of said arm means;

arm operating means for pivoting said arm means to raise and lower the free end of said arm means;

spare wheel coupling means for releasably and pivotally coupling a central portion of a horizontally oriented spare wheel to the free end portion of said arm means so as to maintain the spare wheel in its horizontal orientation as the arm means is raised and lowered and so as to deliver a portion of the spare wheel out from underneath the vehicle as the arm means is lowered; and said arm operating means comprising an externally threaded shaft rotatably connected to and extending axially along said body, an actuator means connected to said shaft for rotating said shaft, an internally threaded cable control means threadably mounted to said shaft and slidably connected to said body so as to permit axial sliding of said cable control means relative to said body, such that rotation of said shaft in a first direction shifts said cable control means axially along the shaft in one direction, and such that rotation of said shaft in a second direction shifts said cable control means axially along the shaft in the other direction opposite said one direction, said arm operating means also including cable means fixed at one end to said body and at its other end to the free end of said arm means, said cable means also being coupled to said cable control means such that shifting of the cable control means along said shaft in said one direction plays out cable and lowers said arm means and shifting of the cable control means along said shaft in said other direction pulls in cable and raises said arm means.

2. An under vehicle carrier for a spare wheel having a tire portion mounted to a central rim portion, comprising:

an elongated body adapted for mounting to the underside of the vehicle with a first end portion of the body positioned adjacent to a side or end margin of the underside of the vehicle;

arm means pivoted at one end to the first end portion of said body for movement about a horizontal pivot axis so as to raise and lower the free end of said arm means;

arm operating means for pivoting said arm means to raise and lower the free end of said arm means;

spare wheel coupling means for releasably and pivotally coupling a central portion of a horizontally oriented spare wheel to the free end portion of said arm means so as to maintain the spare wheel in its horizontal orientation as the arm means is raised and lowered and so as to deliver a portion of the spare wheel out from underneath the vehicle as the arm means is lowered; and said arm means comprising collapsible arm means for reducing the diatance between the horizontal pivot axis and the free end portion of the arm means under conditions of limited clearance between the underside of the vehicle and the ground so as to permit lowering of the spare wheel under such condition.

3. A carrier according to claim 2 in which said arm means includes first and second arm sections pivotally interconnected to form said arm means, said arm means being collapsible at the location of interconnection between said first and second arm sections.

4. A carrier according to claim 3 in which a first end of said first arm section is pivoted to said body, a first end of said second arm section is hinged to the second end of said first arm section, and in which the second end of said arm section comprises the free end of said arm means.

5. An under vehicle carrier for a spare wheel having a tire portion mounted to a central rim portion, comprising:

an elongated body adapted for mounting to the underside of a vehicle with a first end portion of the body adjacent to a side or end margin of the underside of the vehicle;

arm means for supporting the spare wheel;

pivot means for pivoting one end portion of said arm means to said body for movement about a horizontal pivot axis to permit raising and lowering of the free end of said arm means;

biasing means for biasing said arm means to a lowered position;

arm operating means for raising and lowering said arm means;

spare wheel coupling means for releasably coupling the spare wheel to the free end portion of the arm means such that the spare wheel is lowered through an arc and delivered partially out from underneath the vehicle as said arm means is lowered and raised through an arc as said arm means is raised; and said pivot means including a crank portion, said biasing means comprising biasing spring means connected to said body and to said crank portion.

6. An under vehicle carrier for a spare wheel having a tire portion mounted to a central rim portion, comprising:

an elongated body adapted for mounting to the underside of a vehicle with a first end portion of the body adjacent to a side or end margin of the underside of the vehicle;

arm means for supporting the spare wheel;

pivot means for pivoting one end portion of said arm means to said body for movement about a horizontal pivot axis to permit raising and lowering of the free end of said arm means;

biasing means for biasing said arm means to a lowered position;

arm operating means for raising and lowering said arm means;

spare wheel coupling means for releasably coupling the spare wheel to the free end portion of the arm means such that the spare wheel is lowered through an arc and delivered partially out from underneath the vehicle as said arm means is lowered and raised through an arc as said arm means is raised;

said body including a rectangular base plate adapted for mounting to the underside of the vehicle, first and second spaced apart side wall members projecting downwardly from said base plate so as to provide a channel therebetween, a first end plate positioned at the first end portion of the body and extending between the side wall members to close such end of the channel, and a cross plate positioned intermediate the ends of and extending between said side wall members, such that said base plate, side wall members, end plate and cross plate define a box-like compartment which is open at the bottom;

said arm operating means being positioned substantially within the compartment; and said arm means comprising a flat plate-like arm sized and positioned to close the bottom opening of the compartment when the arm is in a fully raised position so as to shield said arm operating means from flying rocks and other adverse elements.

7. A carrier according to claim 6 in which said arm includes at least two arm sections hingedly interconnected so as to permit the arm to collapse under limited clearance conditions.

8. A carrier according to claim 6 in which said arm operating means comprises an externally threaded shaft rotatably mounted at one end to said end plate and extending axially within the compartment, actuator means connected to said one end of said shaft and accessible from the exterior of the compartment for rotating the shaft, an internally threaded cable control means threadedly mounted to said shaft such that rotation of said shaft in a first direction shifts said cable control means axially along the shaft in one direction, and such that rotation of the shaft in a second direction shifts said cable control means axially along the shaft in the other direction opposite said one direction, said cable control means including first and second cable guide extensions extending laterally within the compartment and with the distal ends of said cable guide extensions slidably engaging the respective side wall members, a cable guide extending transversely between the side wall members at a location adjacent said cross plate, a cable fixed at one end to said body at a location adjacent the free end of the shaft and fixed at its other end to the free end of said arm, said cable extending from said free end around said first cable guide extension, around said cable guide, around said second cable guide extension and then around the cable guide to free end of said arm, whereby shifting of said cable control means along said shaft in said one direction plays out cable and lowers said arm means and shifting of the cable control means along said shaft in said other direction pulls in cable and raises said arm means.

9. A carrier according to claim 8 in which said side wall members define respective slots which slidably receive the respective distal ends of said first and second cable guide extensions.

10. A carrier according to claim 7 in which the first of said side wall members comprises a right angular beam with a wall and a flange, the wall of said first side wall member being mounted at one edge to the base plate with the flange of said first side wall member extending away from the second side wall member, said pivot means including a crank extending through said wall and positioned above said flange, said biasing means comprising biasing spring means positioned above the flange and connected to said body and crank, whereby the flange shields said biasing means from flying rocks and other adverse elements.

11. A carrier according to claim 10 in which each of said side wall members comprises a right angular beam with a wall and a flange portion, the wall of said second side wall member being mounted at one edge to the base plate with the flange of said second side wall member extending away from the flange of said first side wall member, and said walls being spaced inwardly from the respective adjacent side margins of the base plate.

12. An under vehicle carrier for a spare wheel having a tire portion mounted to a central rim portion, comprising:

an elongated body adapted for mounting to the underside of a vehicle with a first end portion of the body adjacent to a side or end margin of the underside of the vehicle, said body including a rectangular base plate adapted for mounting to the underside of the vehicle, first and second spaced apart side wall members projecting downwardly from said base plate so as to define a channel therebetween, a first end plate positioned at the first end portion of the body and extending between the side wall members to close such end of the channel, a cross plate positioned intermediate the ends of and extending between said side wall members, such that said base plate, side wall members, end plate, and cross plate define a box-like compartment which is open at the bottom;

arm means for supporting the spare wheel;

pivot means for pivoting one end portion of said arm means to said body for movement about a horizontal pivot axis so as to raise and lower the free end of said arm means;

said arm means comprising a flat, plate-like arm sized and positioned to close the bottom opening of the compartment when the arm means is in a fully raised position;

biasing means for biasing said arm means to a lowered position;

arm operating means for raising and lowering said arm means, said arm operating means comprising an externally threaded shaft rotatably mounted at one end to said end plate and extending axially along said body, actuator means connected to said one end of said shaft and accessible from the exterior of the compartment for rotating the shaft, an internally threaded cable control means threadedly mounted to said shaft such that rotation of said shaft in a first direction shifts the cable control means axially along the shaft in one direction, and such that rotation of the shaft in a second direction shifts said cable control means axially along the shaft in the other direction opposite said one direction, said cable control means including first and second cable guide extensions extending laterally within the compartment, the distal ends of said cable guide extension slidably engaging their respective side wall members, and a cable fixed at one end to said body and at its other end to the free end of said arm means, said cable also being coupled to said cable control means such that shifting of the cable control means along said shaft in said one direction plays out cable and lowers said arm means and shifting of the cable control means along said shaft in the other direction pulls in cable and raises said arm means; and spare wheel coupling means for releasably and pivotally coupling the central portion of a horizontally oriented spare wheel to the free end portion of said arm means so as to maintain the spare wheel in its horizontal orientation as the arm means is raised and lowered and so as to deliver a portion of the spare wheel out from underneath the vehicle as the arm means is lowered, said coupling means including a hook means mounted to and depending from the free end portion of said arm means, said coupling means also including hook engaging means releasably connected to the rim portion of the spare wheel for engaging said hook means to couple the spare wheel to the arm means.

13. A carrier according to claim 12 in which said arm means comprises collapsible arm means for automatically reducing the distance between the horizontal pivot axis and the free end portion of the arm means under conditions of limited clearance between the underside of the vehicle and the ground so as to permit lowering of the spare wheel under such conditions.

* * * * *